Figures 1, 2:
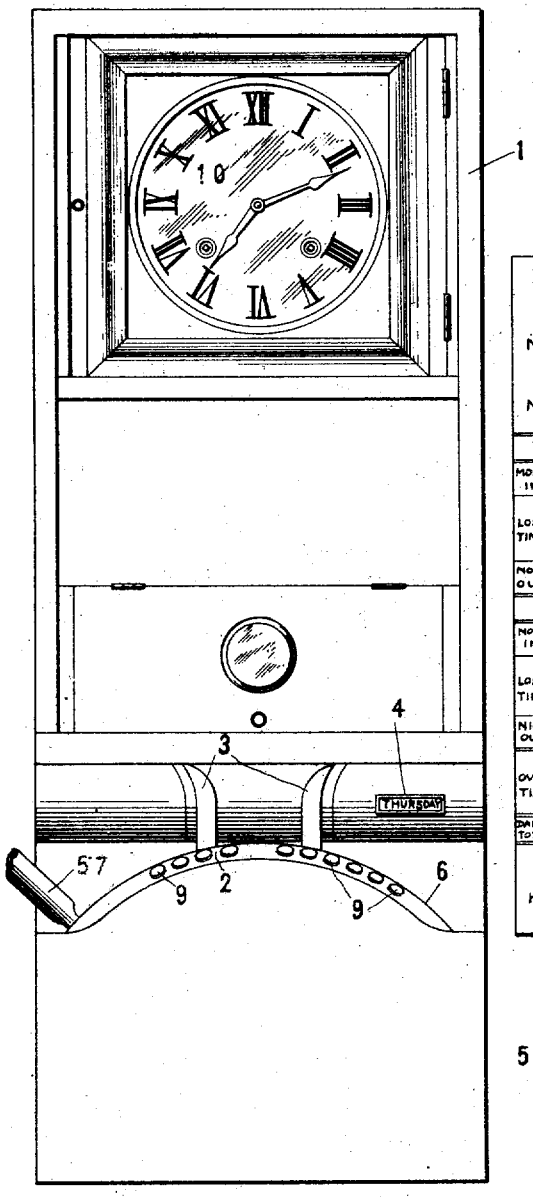

No. 12,761. REISSUED MAR. 10, 1908.

C. T. HAWLEY.

WORKMAN'S TIME RECORDER.

APPLICATION FILED DEC. 16, 1907.

7 SHEETS—SHEET 1.

NO. 10 DATE March 15 1906.

NAME Henry Parker

| | MON | TUE | WED | THU | FRI | SAT | SUN | |
|---|---|---|---|---|---|---|---|---|
| MORN IN | 6 59 | 6 42 | 6 59 | 7 30 | 6 57 | 6 30 | | |
| LOST TIME | | 8 15<br>9 30 | | | 9 45 | | | |
| NOON OUT | 12 1 | 12 5 | 11 59 | 12 00 | | 12 10 | | |
| AFTERNOON | | | | | | | | |
| NOON IN | 12 50 | 12 42 | 12 57 | 1 42 | 3 2 | 12 57 | | |
| LOST TIME | | | | | | | | |
| NIGHT OUT | 6 00 | 6 5 | 6 2 | 5 45 | 6 1 | 5 00 | | |
| OVER TIME | | | | 6 15<br>11 35 | | | | |
| DAILY TOTAL | 10 | 8 3/4 | 10 | 13 3/4 | 5 3/4 | 9 | | |

HOURS 57 1/4 RATE 25¢ AMT $14.31

WITNESSES
J. Clyde Kipley.
Samuel L. Allpert.

INVENTOR
C. T. Hawley
BY
Duell, Warfield & Duell
ATTORNEYS

No. 12,761. REISSUED MAR. 10, 1908.

C. T. HAWLEY.

WORKMAN'S TIME RECORDER.

APPLICATION FILED DEC. 16, 1907.

7 SHEETS—SHEET 2.

WITNESSES
Norman Perry
Samuel L. Alpert.

INVENTOR
C. T. Hawley
BY
Duell, Crosfield & Duell
ATTORNEYS

No. 12,761. REISSUED MAR. 10, 1908.

C. T. HAWLEY.

WORKMAN'S TIME RECORDER.

APPLICATION FILED DEC. 16, 1907.

7 SHEETS—SHEET 3.

WITNESSES

J. Elijah Kipley

Samuel L. Allport.

INVENTOR

C. T. Hawley

BY

Duell, Warfield & Duell

ATTORNEYS

No. 12,761. REISSUED MAR. 10, 1908.

C. T. HAWLEY.

WORKMAN'S TIME RECORDER.

APPLICATION FILED DEC. 16, 1907.

7 SHEETS—SHEET 4.

WITNESSES

J. Clyde Ripley

Samuel L. Albert

INVENTOR

C. T. Hawley

BY

Duell, Warfield & Duell

ATTORNEYS

No. 12,761. REISSUED MAR. 10, 1908.

C. T. HAWLEY.

WORKMAN'S TIME RECORDER.

APPLICATION FILED DEC. 16, 1907.

7 SHEETS—SHEET 5.

WITNESSES

Norris Perrye

Samuel L. Allpert.

INVENTOR

C. T. Hawley

BY

Duell, Warfield & Duell

ATTORNEYS

No. 12,761. REISSUED MAR. 10, 1908.

C. T. HAWLEY.

WORKMAN'S TIME RECORDER.

APPLICATION FILED DEC. 16, 1907.

7 SHEETS—SHEET 6.

WITNESSES

Norvin Perryo

Samuel L. Alpert.

INVENTOR

C. T. Hawley

BY

Duell, Warfield & Duell

ATTORNEYS

No. 12,761. REISSUED MAR. 10, 1908.

C. T. HAWLEY.

WORKMAN'S TIME RECORDER.

APPLICATION FILED DEC. 16, 1907.

7 SHEETS—SHEET 7.

WITNESSES

J. Clyde Kepley

Samuel L. Allpert.

INVENTOR

C. T. Hawley

BY

Duell, Warfield & Duell

ATTORNEYS

UNITED STATES PATENT OFFICE.

CHARLES T. HAWLEY, OF GARDNER, MASSACHUSETTS, ASSIGNOR TO SIMPLEX TIME RECORDER COMPANY, OF GARDNER, MASSACHUSETTS, A CORPORATION OF MASSACHUSETTS.

WORKMAN'S TIME-RECORDER.

No. 12,761. Specification of Reissued Letters Patent. Reissued Mar. 10, 1908.

Original No. 853,878, dated May 14, 1907, Serial No. 322,662. Application for reissue filed December 16, 1907. Serial No. 406,824.

*To all whom it may concern:*

Be it known that I, CHARLES T. HAWLEY, a citizen of the United States, and a resident of Gardner, county of Worcester, State of Massachusetts, have invented an Improvement in Workmen's Time-Recorders, of which the following description, in connection with the accompanying drawings, is a specification, like letters on the drawings representing like parts.

This invention relates to apparatus for recording on a suitable card or other check the time when a workman enters or leaves his place of employment, each employee having his individual card, which in practice is conveniently used for one week, the records on the card determining the compensation due the workman for a given period.

Should the employee leave his work for a longer or shorter period between the regular hours for beginning and stopping work such absences must be recorded on the card of that employee, in order that suitable deductions may be made for lost time.

In the present embodiment of my invention I have so constructed and arranged the apparatus that time records for each day will be made in vertical columns on the card, the columns being arranged in parallelism in the sequence of the days of the week. Herein I have shown a time recording apparatus of the type wherein the workman, by a selective movement, sets the apparatus in readiness to stamp or mark the proper "In" or "Out" record on the card. The position of the card in the card receiver or guide is determined by such selective movement, and the relative position of the card and the stamping instrumentality is thereby fixed in one direction. Such relative position, of course, varies for different times during the day, the several records falling under each other in the column for that day, and I have provided novel means whereby the relative position of the card and stamping instrumentality, laterally, is so governed that no records for one day can be superposed upon those for another day. This relative lateral positioning of the time stamp and the card is governed by periodically changing means, and rendered operative by the employee who first operates the apparatus after such periodic change, so that during that period, for convenience twenty-four hours, there will be no change in the lateral positioning of the time stamp. Herein the card receiver or guide is fixed and the time stamp is movable relatively thereto, and at the end of each period the stamp is returned automatically to a neutral or starting position, in readiness to be positioned properly for the ensuing period by the first operation of the apparatus thereafter as will be made clear hereinafter.

The card is so positioned for the daily time record that the earliest record is made at or near the top of the appropriate column, the time of later operations of the apparatus being recorded at intervals down the column.

The time recording instrumentality is operated and controlled by or through a suitable time movement or clock, but the detailed mechanism of such instrumentality is not claimed herein, as it forms a part of the subject-matter of another application Serial No. 284,286, filed by me and copending herewith.

The various novel features of my present invention will be fully described in the subjoined specification and particularly pointed out in the following claims.

Figure 3:
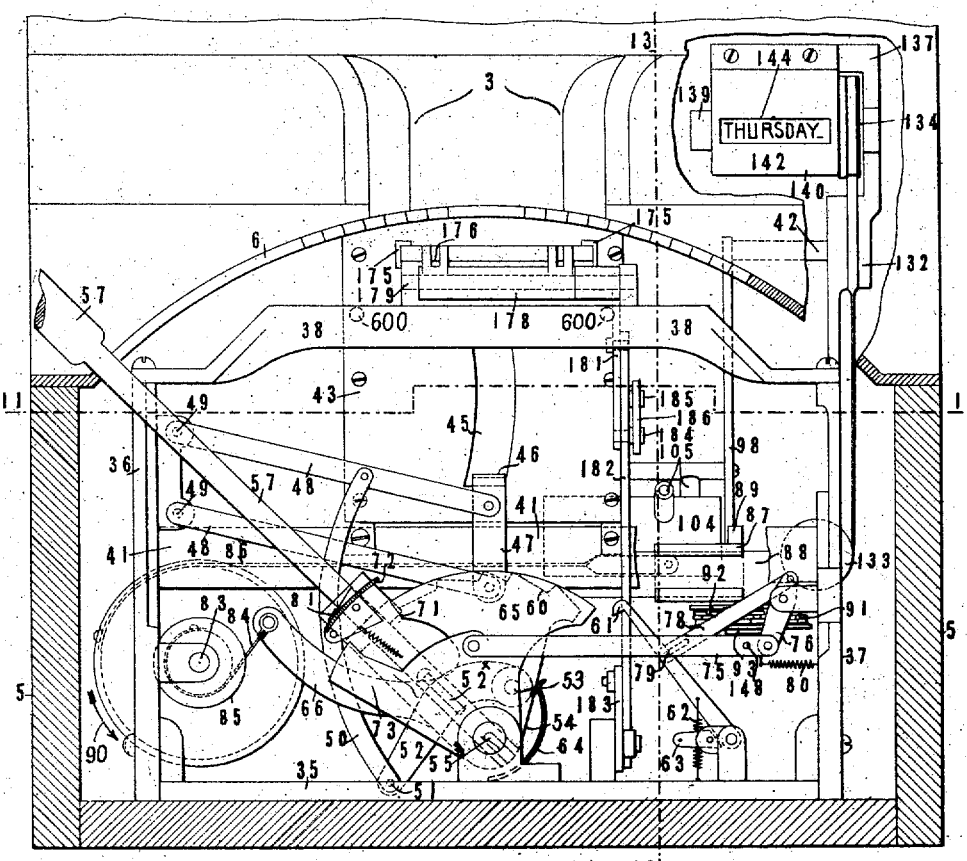
Figure 4:
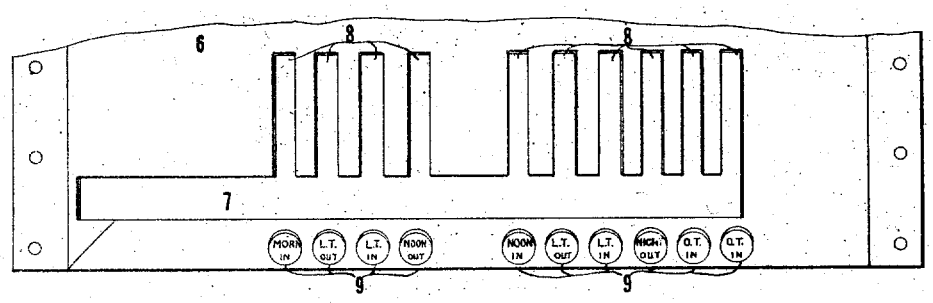
Figure 5:
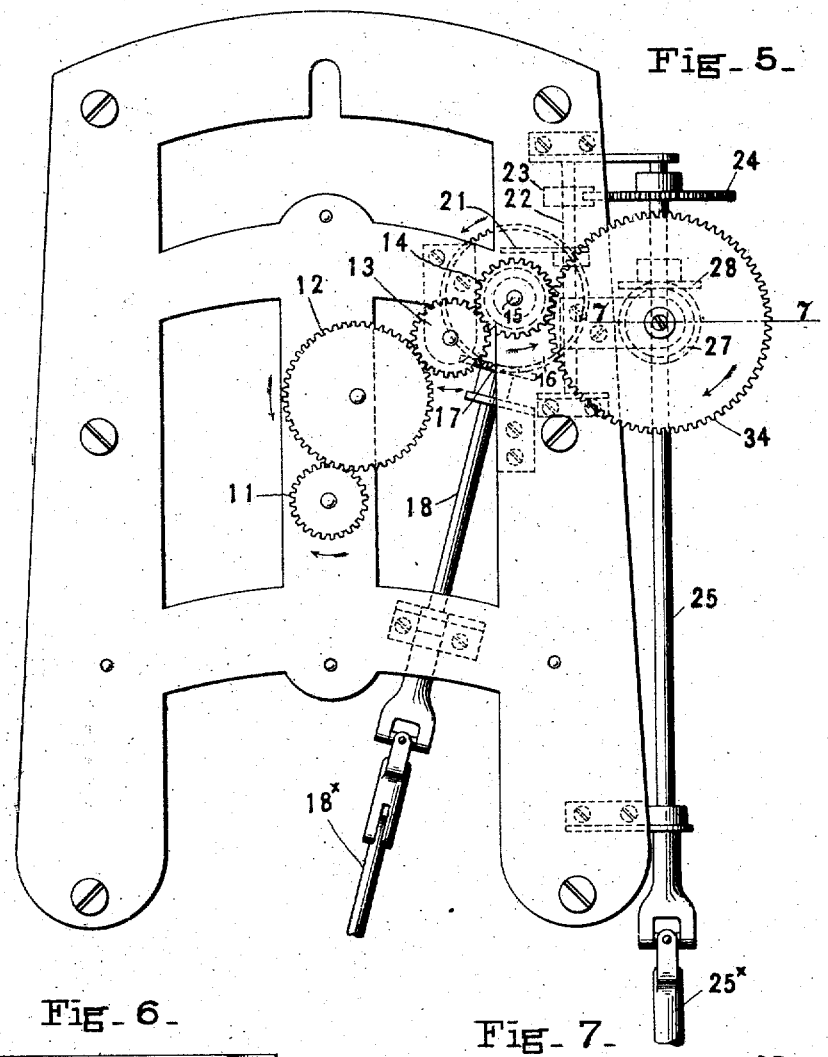
Figure 6:
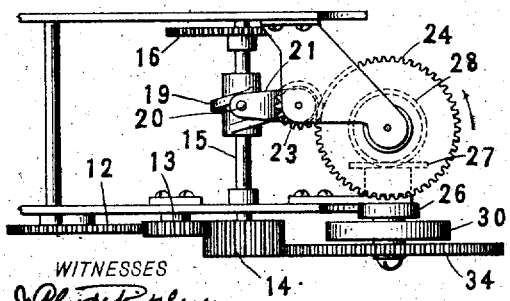
Figure 7:
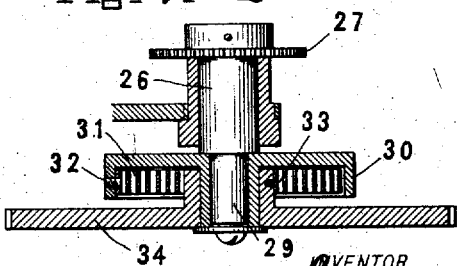
Figure 9:
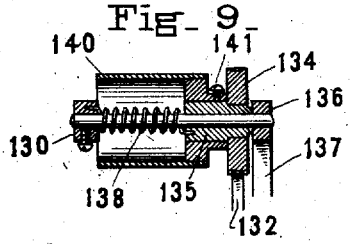
Figure 8:
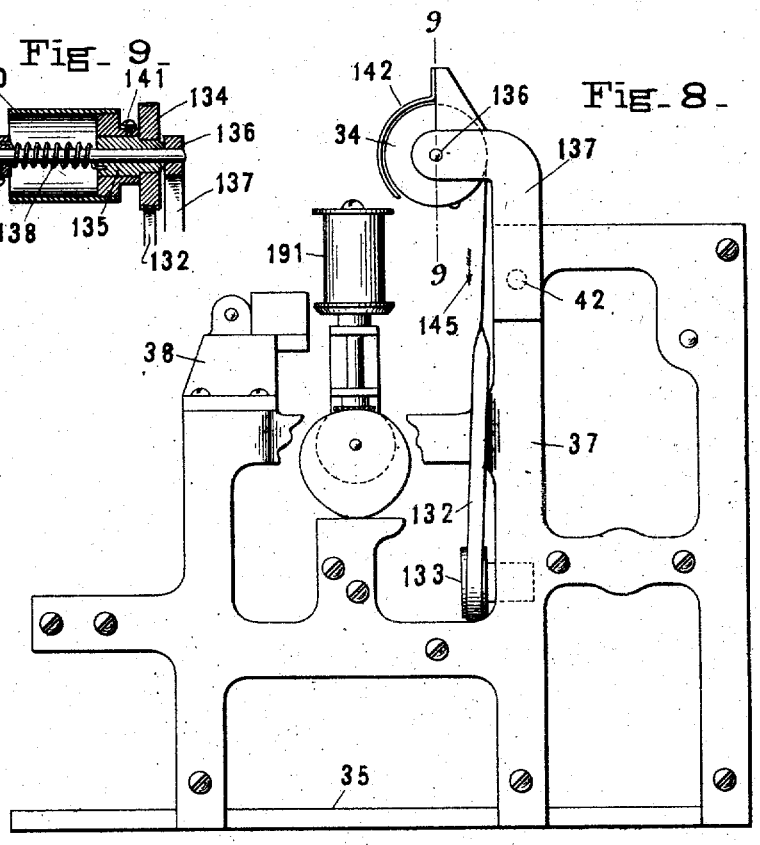
Figure 10:
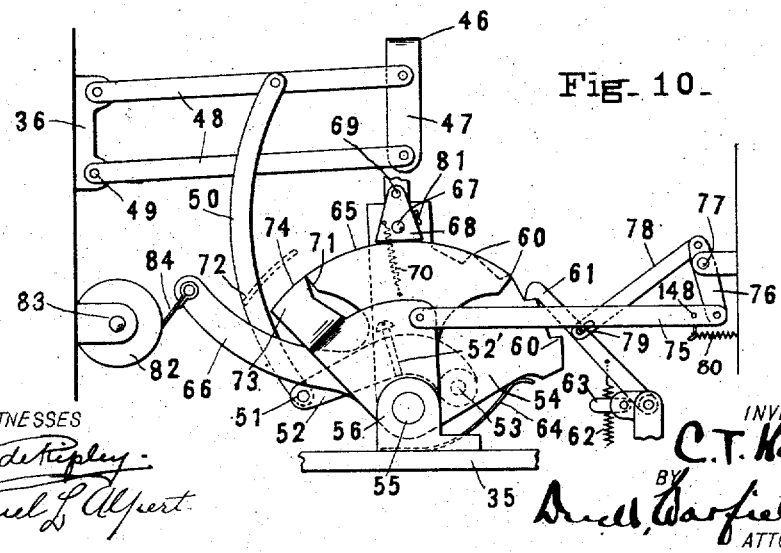
Figure 11:
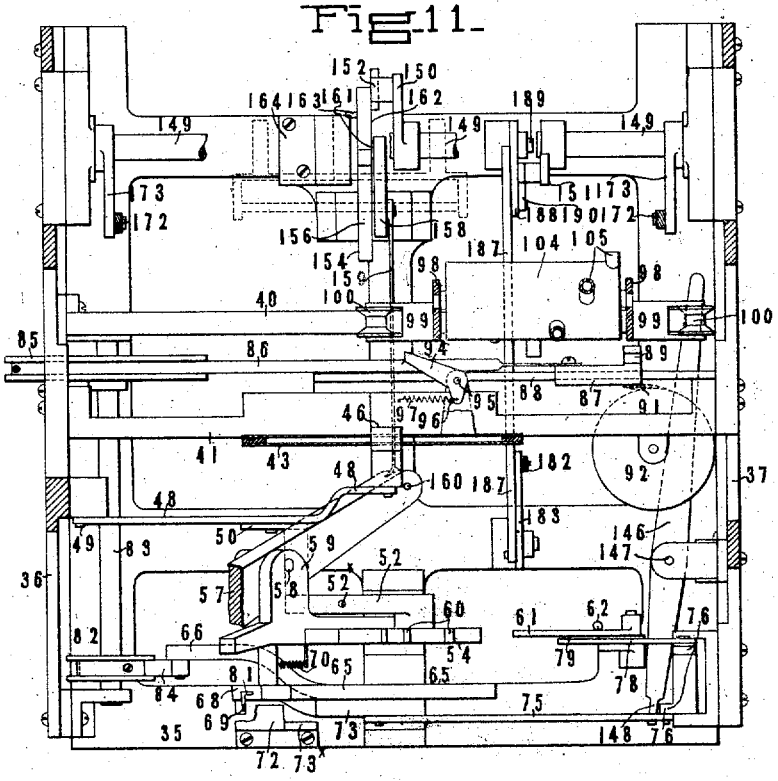
Figure 12:
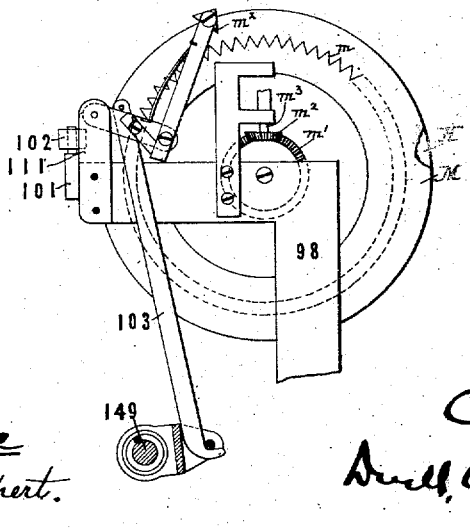
Figure 13:
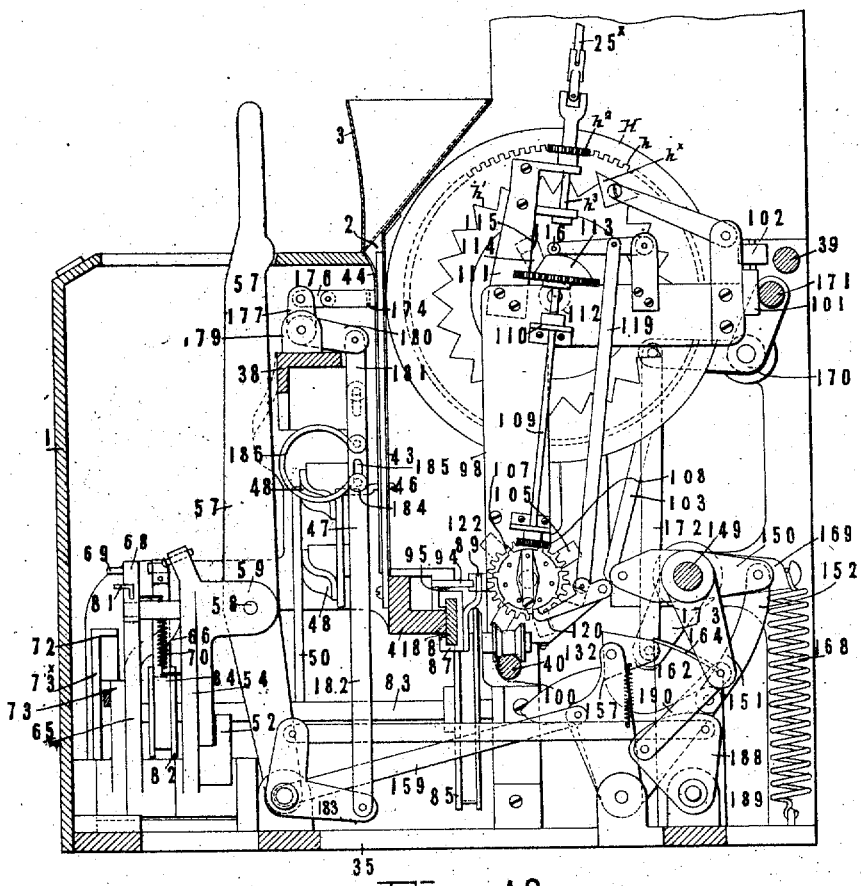
Figure 14:
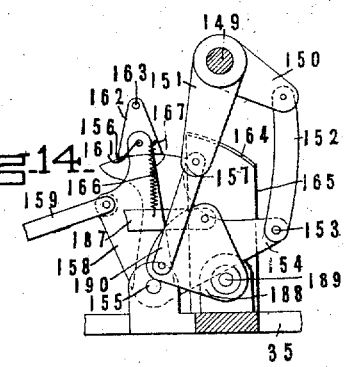
Figure 15:
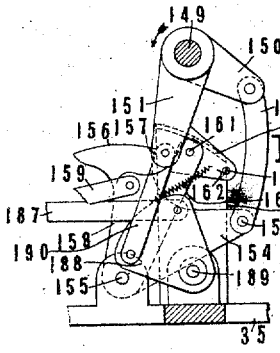
Figure 16:
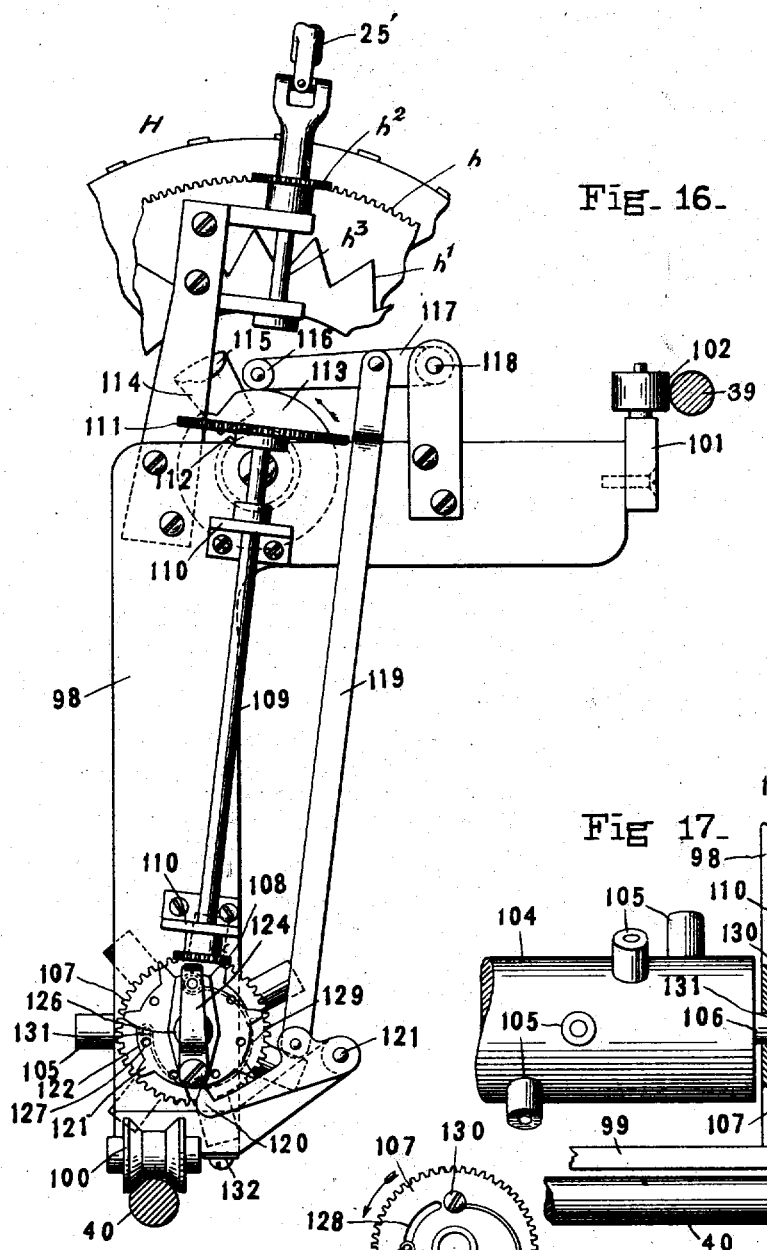
Figure 17:
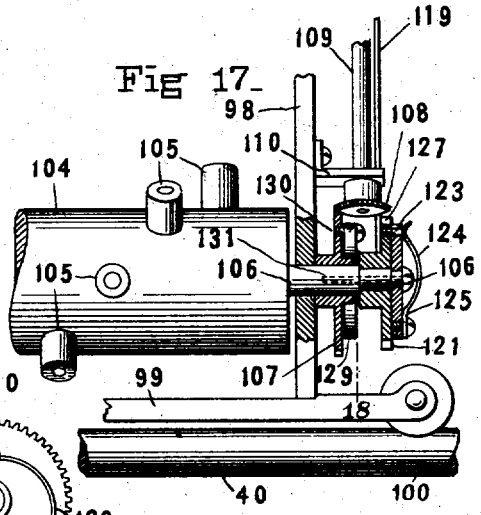
Figure 18:
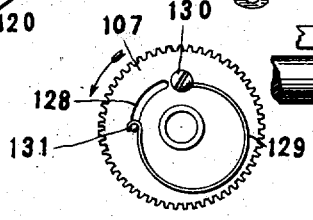

Figure 1 is a front elevation of a workman's time recorder embodying my present invention, inclosed in a protective casing, showing the face or dial of the time movement or clock, and the visual indicator for the daily change; Fig. 2 is a view of one of the individual cards or checks used in connection with my time recorder; Fig. 3 is an enlarged front elevation of the mechanism in the lower part of the casing, the front of the latter being broken out below the guide or indicator for the selective and other movements of the manually operated actuator; Fig. 4 is a top plan view of such guide or indicator, to be hereinafter referred to; Fig. 5 is an enlarged detail of the frame of the time movement or clock, showing the driving connection between the latter and the minute marking member of the time stamp, and the cooperating mechanism for effecting intermittent advance of the hour marking member of the stamp at predetermined intervals; Fig. 6 is a top plan view of the parts shown in Fig. 5, to illustrate the let-off, which controls the advance of the hour marking member; Fig. 7 is an enlarged section taken on the line 7—7, Fig. 5, showing the spring motor which advances the said hour marking member, such motor being alternately wound up and released, as will be described; Fig. 8 is a right hand side elevation of the frame work on which the operative parts shown in Fig. 3 are mounted, the retracting means for the time stamp carriage, and the visual indicator being shown in place, together with one of the ink ribbon supporting devices; Fig. 9 is a vertical section on the line 9—9, Fig. 8, of the visual indicator and the retracting spring; Fig. 10 is a front elevation of the card-positioning stop and the means by which its movement is effected through operation of the manually-operated actuator, said parts being shown in Fig. 3 in the position assumed at the end of each daily period; Fig. 11 is a transverse section on the line 11—11, Fig. 3, showing the parts of the apparatus below the section line, and in the position assumed in Fig. 3; Fig. 12 is a left hand side elevation of the hour and minute marking members of the time stamp, and a part of the adjacent mechanism; Fig. 13 is a view of the parts at the left of the line 13—13, Fig. 3, but with such parts in a different position, the time stamp being in its proper position laterally with relation to the card receiver, and with the stamp making an impression and just about to be released automatically from the control of the manual actuating device; Fig. 14 is a detail in side elevation of the mechanism by which the time stamp is coupled to and uncoupled from the actuating handle, taken just after the release or uncoupling which is about to be effected in Fig. 13; Fig. 15 is a similar view of the same mechanism, but in normal position, coupling the time stamp and actuating handle together in readiness to cause the stamp to mark a card when the handle is operated; Fig. 16 is an enlarged right hand side elevation of the time stamp carriage, with the periodically changing means which governs the lateral position of the carriage, taken just after a change and with the let-off in engagement with the detent, the means for controlling the latter also being shown; Fig. 17 is a partial front elevation and section of the periodically changing means, to show clearly the drum or carrier on which the series of carriage stops are helically arranged, the connection between said drum and the let-off means, and the manual adjustment thereof; Fig. 18 is an outer face view of the gear shown in Figs. 16 and 17 as co-axial with the drum, the segmental slot in the gear, and the spring between the latter and the let-off member, to be described, the parts being at the left of the line 18, Fig. 17.

The casing 1, Fig. 1, of suitable size and shape to contain the operative parts of the apparatus, has in its upper portion a time movement or clock with exposed dial and hands as usual in such apparatus, the bottom of the casing inclosing and protecting the mechanism for stamping or recording the time upon a suitable card, an opening at 2 in the casing communicating with the open upper end of the card receiver or guide. Wings 3 at the sides of the opening direct the card into the receiver, and a sight-opening 4 permits a visual indicator to be seen from the exterior, the indicator showing the day of the week. The lower portion 5 of the casing has a transversely arched top 6, Figs. 1, 3 and 4, provided with an elongated guideway or slot 7, and intersecting the same at right angles are a series of parallel, shorter slots 8, ten of such short transverse slots being shown in Fig. 4. These slots serve to guide the secondary movement of the actuating member or handle at selected points in its main path of movement along the slot 7, said handle being moved by the operator or workman until it is opposite the desired slot of the series 8.

Preferably the series will be properly marked to indicate to the workman which one he should select for a given period in the day, such as "Morning in," "Noon out," "Noon in," "Lost time in," "Night out," etc., as shown in Fig. 4, the phrases being abbreviated on disks or buttons 9 secured to the casing. The use of such indications will be obvious, but it may be stated that the "Morning in" slot is used when a workman desires to stamp his card when going to work, and for lost time, morning or afternoon, the "Lost time in," and "Lost time out" slots will be used, at one or the other side of the "Noon" slots.

Overtime is indicated by the two slots at the extreme right of the series Fig. 4, but it will be manifest that any suitable number more or less, of indicating or guide slots may be employed, according to the exigencies of a particular case.

The arbor of the minute hand 10 of the time movement has a pinion 11 fast thereon, Figs. 5 and 6, driving a train of gears 12, 13, 14, the latter fast on a shaft 15 provided with a second and larger gear 16 meshing with a pinion 17 on a spindle 18, Fig. 5, the latter being connected by a universal joint with an extension 18× operatively connected with and to drive continuously the minute marking member or wheel of the time stamp, to be again referred to.

A let-off, shown as a worm 19 of very sharp pitch, is mounted on the shaft 15, Fig. 6, to coöperate with a pin 20 on and control the rotation of an arm 21 fast on an upright shaft 22 provided with a pinon 23 meshing with a gear 24 fast on an upright spindle 25 mounted in fixed bearings on the frame of the time movement and connected by a universal joint with an extension 25×.

A short shaft 26 has fast upon it a gear 27 in mesh with a gear 28 on the spindle 25, and on the reduced end 29, Fig. 7, of shaft 26 is fixedly mounted the hub of a flanged disk 30 in which is located a coiled motor spring 31, one end of which is secured to the disk at 32, its other end being attached at 33 to the hub of a gear 34 which rotates loosely on the disk hub, said gear meshing with the gear or pinion 14.

When the worm let-off 19 is in engagement with the pin 20 the spindle 25 is thereby held from rotation, and consequently the shaft 26 and spring-case 30 are maintained stationary, but the gear 34 is being rotated from the arbor of the minute hand, and the motor spring 31 is wound up. Upon the release of the pin 20 by the let-off 19 the spring is free to expand, and it rotates the spindle 25, the arm 21 making one complete revolution and again engaging the worm, whereupon the foregoing operation is repeated. The gearing is so proportioned that the let-off releases the spring at hourly intervals, and the hour marking member or wheel of the time stamp is connected with and driven by the extension $25^{\times}$, so that said marking member is advanced at hourly intervals while the minute marking member is driven continuously. The gradually stored up energy in the spring 31 serves to effect a quick advance movement of the hour marking member at each release, so that the change of the hour is made promptly and accurately.

The arrows on Figs. 5 and 6 indicate the direction of the several gears, shafts and spindles therein shown.

The record card or check used in the present apparatus is shown in Fig. 2, and preferably it is made of stiff cardboard having at its upper end a heading for the name or number of the employee, and below it the proper abbreviations for the days of the week are printed in a horizontal line across the card.

By means of vertical rulings the card is divided into a series of parallel columns, each corresponding to a day, and at the left is a column in which are printed indications as to the time of day, such as "Morning in," "Lost time," "Noon out," etc.

The card is divided horizontally by a space in which the word "Afternoon" is printed, and below the horizontal division indicating "Night out" a space is left for overtime records above the daily totals for the several columns.

By a comparison of the card in Fig. 2 with the indicator or guide for the employee, shown in Fig. 4, it will be seen that the indications in the left-hand vertical column of the card corresponds to the indicating slots 8 of Fig. 4.

In using the cards in the present apparatus, the time records of each employee for a given day are stamped or printed in the vertical column corresponding to such day, and the relative vertical position of the card and the time stamp is determined at the will of the operator, when he makes a record on his card, while a daily change in the relative position of the card and time stamp is provided for, such daily change being automatically governed by periodically-changing means, but the latter are brought into operation by or through the first actuation of the apparatus on a new day.

When the employee comes to work in the morning, the actuating device or handle of the apparatus to be hereinafter described is moved along the slot 7, Fig. 4, until opposite the transverse slot 8 indicating "Morning in," this first movement of the actuator or handle being what I term a "selective movement," and when properly positioned, the handle is pushed or moved inward along the selected slot 8, and this secondary movement operates the time stamp to mark a record on the card in the vertical column of the proper day and opposite the "Morning in" space on the card. Similarly selective movements of the actuator are made when the employee leaves at noon, and returns at one o'clock or thereabout, and also when he leaves his work for the day, indicated by "Night out" space.

Should the employee leave his work during the morning or during the afternoon, such absence is "Lost time," and the proper records of such lost time are made in the spaces on the card opposite the "Lost time" indications printed thereon.

The operating mechanism is mounted on a skeleton frame, comprising a base plate 35, upright sides 36, 37, rigidly connected with the base plate, and a bridge 38 rigidly connecting the sides, the latter also being connected at their rear upper corners by a cross-girth 39, a second cross-rod 40 being secured at its ends to the sides lower down, see Fig. 13, and in front of the rod 40 is a cross-girth 41. The cross or tie-rods 39, 40 form a fixed track on which moves transversely the carriage on which the time stamp is mounted. A rod 42 is extended inward from the frame-side 37 to engage a part of the carriage when the latter is retracted, to limit its retracting movement.

The card receiver or guide, in which the card is inserted and held when a time record is made, is shown as an upright metallic case 43, fixedly secured to the bridge 38, by screw 600, see dotted lines Fig. 3 and at its lower end to the cross-girth 41, the upper end of the receiver registering with the opening 2 in the casing, and the mouth of the receiver is flared at 44, Fig. 13, so that the card may be readily inserted therein, and withdrawn after the record is made.

The front and rear walls of the receiver are provided with a longitudinal or upright opening 45, best shown in Fig. 3, such opening being slightly curved in the direction of its length, and into this opening projects a stop 46 which is movable up and down and forms the bottom for the receiver, and on which the lower edge of a card rests when inserted in the receiver to receive a record thereon. This stop 46 is made by bending over the upper end of a plate 47 pivotally connected to parallel links 48, Figs. 3 and 10, fulcrumed at their outer ends at points 49, on the frame-side 36, the swinging of the links serving to raise or lower the stop, and maintaining the stop 46 horizontal.

A radius bar 50 pivotally connected at its upper end with one of the links is pivoted at its lower end at 51 to a shorter arm 52, fulcrumed at 53 on a plate 54 fast on a short fulcrum shaft 55, mounted to rock in bearings 56, on the base plate 35 of the frame. This plate serves as a rocking support for the actuating handle 57, the latter being pivotally connected at 58 with the support between ears 59 thereon, see Fig. 13, the pivot 58 being at right angles to the fulcrum 55, so that the handle can be swung in unison with the support 54, about the fulcrum 55 and said handle can also be swung in a plane at right angles to such movement on its pivot 58.

The upper edge of the support is provided with a series of shallow teeth 60, adapted to be engaged one at a time by the detent 61 mounted on the frame, and normally controlled by a spring 62, the detent acting to hold the support in any given position, when engaging one of the teeth 60, until the said support is positively moved therefrom. Herein the teeth are so arranged that the one at the extreme right-hand end of the support, Fig. 10, is brought into engagement with the detent for the "Morning in" position of the actuating handle, the second tooth for "Morning out," the third tooth for "Noon in" and the fourth tooth for "Night out," it being unnecessary to provide teeth for the lost time or overtime intervals which may be called into operation.

If it is desired to throw the detent out of operation altogether, it can be accomplished by a throw-off lever 63, fulcrumed adjacent the pivot of the detent and having a cam-end to bear against the latter, as shown in Figs. 3 and 10. Of course, it will be understood that this throw-off device can only be made operative by opening the casing of the apparatus, such throw-off device being absolutely out of control of the employee.

From the description so far it will be seen that the selective movement of the handle or actuator in its main path of movement will determine the height of the stop 46 with relation to the card receiver, and therefore the greater the selective movement of the handle, the less will be the effective depth of the card receiver, so that the record stamped or marked upon a card will be positioned in one of the vertical or day columns higher up or lower down thereupon, according to whether the stop is lowered or raised respectively.

A leaf spring 64 is arranged to bear against the advancing edge of the plate or support 54 when the handle is moved to the right, Fig. 3, the spring acting to return the handle to normal or initial position shown in Fig. 3, whenever the detent is rendered inoperative, such release being effected automatically at periodic intervals, as will be hereinafter described.

Referring to Figs. 3 and 10, it will be seen that the pivot 53 of the arm 52, is located at one side of the fulcrum 55, and the radius bar 50 is connected at 51 with the arm 52 at the other side of the fulcrum, and when the support 54 is swung to the right from its position shown in Fig. 3, an adjustable stud 52× on the arm 52 is caused to engage the hub of the support, and as the movement of the support 54 continues, the pivot 53 is lowered, thereby raising the other or free end of said arm 52, and through the radius bar 50 and the links 48 elevating the card stop 46, proportionately to the angularity of movement of the support 54.

A segmental member 65 having an arm 66 is mounted to rock loosely on the fulcrum 55 adjacent the support, the latter having pivoted thereon at 67 a triangular coupling member 68, provided with a lateral follower 69, a spring 70 attached at one end to the coupling member, and at its other end to any convenient part of the apparatus, as for instance to the support 54 tending to turn the said member 68 on its pivot when the spring is permitted to act.

The face of the coupling member is adapted either to ride over the curved edge of the segment as in Fig. 10, or to engage the end 71 thereof when the coupling member is positioned as shown in Fig. 3.

If the coupling member is maintained in such latter position, operating movement of the actuating handle will cause the coupling member to couple together the handle support 54 and the segment, so that the latter will rock in unison with said support, elevating the extension 66 for a purpose to be described.

A cam-like controller 72 shown in section Fig. 3, and in dotted lines Fig. 10, is mounted on a bracket 73×, Figs. 11 and 13, on the base plate, in such position that the follower 69 can ride under or above the controller and when the coupling member is turned as in Fig. 3, the follower will travel beneath the controller and in engagement therewith, when the actuating handle is swung to the right, and as the coupling member then acts against the edge 71 of the segment, the latter will be coupled to the handle, and will be moved therewith until the follower leaves the upper end of the controller 72, whereupon the member 68 will be immediately swung on its pivot into the relative position shown in Fig. 10, uncoupling the segment from the handle. On the return of the latter to its normal or starting position, the follower will, when it reaches the edge 71 of the segment, either drop down and again position the follower 69 below the controller 72, or if the coupling member is maintained in the relative position shown in Fig. 10, the follower will travel above the top of the controller 72.

An arm 73 loosely mounted to swing on the fulcrum 55 has a peripheral portion 74 of the same curvature as the edge of the segment, and if said arm is moved up against the segment, as in Fig. 10, the return movement of the handle to starting position will carry the controlling member 68 onto the face 74 of the arm 73, preventing any turning movement of the coupling member into coupling position, and so long as the parts remain in this position, there will be no coupling of the segment 65 with the actuating handle.

A link 75 is pivotally connected at one end to the arm 73, and at its other end to a short lever 76 fulcrumed at 77 on the frame-side 37, the shorter arm of the lever 76 being pivoted to a link 78 having a slot and pin connection at 79 with the detent 61. A spring 80 normally acts to maintain the arm 73 and segment in engagement as shown in Fig. 10. When, however, the link 75 is moved against the action of its spring, it separates the arm and segment, as in Fig. 3, and permits the coupling member to turn on its pivot 67 into coupling position, the follower dropping down from the left hand end of the controller 72 into position underneath it.

As will be hereinafter described, the movement of the time stamp carriage to its initial or starting position at the end of each day moves the link 75 against its spring 80 to separate the arm 73 and the segment, and permit the coupling member to assume its coupling position. A stop 81 on the coupling member is adapted to rest upon the top of the controller 72, when the coupling member is turned into coupling position. The arm 73 is therefore a positioning device for the coupling member permitting movement of said member into coupling position when the positioning device and the segment are separated, and preventing movement of the coupling member into coupling position when the spring 80 is free to act to hold the segment and positioning device in coöperation.

The fixed controller and the movable positioning device therefore coöperate in a manner to govern the action of the coupling member.

As will be hereinafter described, upon the first operative movement of the actuating handle on any given day, the carriage is set automatically with relation to the card-receiver for that particular day, and such positioning of the carriage permits the spring 80 to act upon the positioning device 73, to move it into coöperative relation with the segment, instantly upon the uncoupling of the latter from the actuating handle, so that the segment and positioning device throughout the rest of that day maintain the relative position shown in Fig. 10.

The relative positions of the handle-support 54, the segment 65 and the positioning device 73, on the fulcrum-shaft 55, are clearly shown in Figs. 11 and 13, the end of the positioning device being bent or offset laterally to lie in the path of the segment, and it will be noted that the extension or prolongation 66 of the segment is also bent laterally to bring it in proper position with relation to a sheave 82 fast on a horizontal shaft 83 mounted in bearings on the frame side 36, a flexible connection 84 being attached at its ends respectively to the extension and to the sheave.

A larger sheave 85 fast on said shaft 83 has attached to it one end of a flexible connection 86, the other end of which is attached to a slide-block or traveler 87 mounted to slide transversely on a guideway 88 secured to or forming part of the cross-girth 41, said traveler having a projecting lug 89 for a purpose to be described.

The connections 84 and 86 are oppositely wound around their respective sheaves, and in such manner that when the segment is swung by movement of the actuating handle 57, as hereinbefore described, the shaft 83 will be rotated in the direction of arrow 90, Fig. 3, and thereby partly wind up the connection 86 on its sheave to draw the traveler 87 to the left, viewing Figs. 3 and 11. This movement of the traveler consequently is effected upon the first operative movement of the actuator or handle of the apparatus on any given day, and such traveler movement serves to properly position the time stamp carriage with relation to the card receiver for that day.

A chain or other suitable connection 91 attached to the traveler is wound around a horizontal sheave 92 pivotally mounted on the cross-girth 41 at the right-hand side of the frame, and provided with a coiled clock spring 93, see Fig. 3, where the spring is shown in edge view so wound that when the traveler is moved to the left, viewing Fig. 11, the spring will be wound up, and when the segment 65 is released or uncoupled from the actuating handle, the spring 93 expands and returns the traveler to its normal position, and at the same time, the shaft 83 is turned oppositely to the arrow 90, retracting the segment to its normal position, as shown in Fig. 3.

Referring to Figs. 11 and 13, an abutment 94 is shown as mounted on a vertical pivot 95 on the cross-girth 41, the tail of the abutment being normally held against a stop 96 by a spring 97, Fig. 11, the abutment thus being yieldingly controlled and having a movement in a horizontal path against the action of its spring, said abutment being utilized to coöperate with one of a series of carriage stops and determine the lateral position of the carriage. Said carriage consists of two rigidly connected and substantially-shaped sides 98 provided at their lower ends with a connecting member 99, see Fig. 17, provided with guide rolls 100, which travel upon the tie-rod or track 40, to vertically support the carriage, the upper ends of the sides being connected by a cross-piece 101, provided with a roll 102, which bears against a tie-rod 39 when the carriage is in its non-stamping position, see Figs. 13 and 16.

On the carriage I mount the hour-marking member or wheel H, provided with peripheral printing type, equally disposed around the periphery and running from 1 to 12 inclusive for the A. M. hours, and from 1 to 12 inclusive for the P. M. hours, a ring-gear $h$ and a centering ratchet $h'$ being attached to the outer side of the hour wheel to rotate therewith, the ring-gear meshing with a pinion $h^2$ fast on a short shaft $h^3$ rotatably mounted on the carriage, and connected by suitable universal joints with the extension $25^\times$ hereinbefore referred to, whereby the intermittent advance of the hour wheel is effected. This construction is shown in Figs. 13 and 16.

The minute-marking member or wheel M, shown in Fig. 12, is peripherally divided and provided with numbers, preferably from 1 to 59 inclusive, and zero, and a ratchet $m$ is connected with the minute wheel to rotate therewith, a bevel-gear $m'$ fast on the minute wheel shaft meshing with a bevel gear $m^2$ on a short shaft $m^3$ mounted in bearings on the carriage, said shaft in practice being connected with the extension $18^\times$, Fig. 5, whereby the minute wheel is driven continuously from the clock or time movement.

A pawl $h^\times$, Fig. 13, is arranged to coöperate with the ratchet $h'$, and a second pawl $m^\times$ is arranged to coöperate with the ratchet $m$, by means of a link 103, Fig. 12, to center the hour and minute marking wheels at the time the stamp is operated to mark an impression on the card.

Inasmuch as the hour and minute wheels and the means for controlling the same form no part of this present invention, being fully described and claimed in my co-pending application hereinbefore referred to, further description of such parts will not be made herein, it sufficing to say that the link is depressed when the time stamp is moved to mark an impression.

At the lower end of the carriage I have rotatably mounted a drum or follower 104, clearly shown in Fig. 11, and on a larger scale in Fig. 17, the drum being provided with a series of radially-projecting and helically or spirally arranged stops 105, there being shown herein seven of such stops corresponding in number to the days of the week, including Sunday.

One end of the drum shaft 106 is extended through the side frame 98 of the carriage and has loosely mounted upon it a gear 107, in mesh with a pinion 108 on the lower end of a shaft 109, see particularly Figs. 13, 16 and 17, supported in fixed bearings 110, on the carriage, the upper end of the shaft having a larger gear 111, fast upon it, and meshing with a pinion 112, fast on the shaft of the hour-marking member or wheel H, said shaft also having fast thereon a cam-disk 113, provided with a low-point or drop 114, and opposite the drop a guard portion 115 is mounted to rotate with the hour-marking member.

A follower roll 116 is mounted on an arm 117, fulcrumed at 118 on the carriage, and connected by a link 119 with a detent 120, fulcrumed at 121 on the carriage. The follower 116 as it coöperates with the periphery of the cam 113, operates through the intervening connections to normally retain the detent 120 in operative position, Fig. 16, in engagement with one of the teeth 121 of a let-off member 122, there being seven teeth on said member, the latter being loosely mounted on the reduced outer end of the drum-shaft 106, as shown in Fig. 17. Such let-off member, however, is normally connected to rotate with the drum by means of a pin 123, carried by a spring-finger 124, fast on a plate 125, mounted on the squared end $106^\times$ of the drum shaft, and held in place thereon by a suitable headed stud 126. The let-off member is provided with a series of holes 127 circularly arranged and into any one of which the pin 123 can be inserted. As the plate 125 rotates with the drum, it will be manifest that the let-off member 122 will also rotate with the drum, when the pin 123 is seated in one of the holes 127. By retracting the spring finger 124, the let-off member can be turned with relation to the drum or vice versa to permit a manual adjustment of the carriage with relation to the card guide.

The gear 107 is provided with a segmental slot 128, see Fig. 18, and one end of a bow spring 129 is fixedly attached to the face of the gear by a stud 130, the other end of the spring bearing against a pin 131 fast on the let-off member, shown in section in Fig. 18, and in dotted lines Figs. 16 and 17. The direction of rotation of the gear 107 is shown by the arrow in Fig. 18, and supposing that the detent is operative, preventing rotation of the let-off member and drum, the gradual advance of the hour-marking wheel H will rotate the gear 107, the transmitting gearing intermediate said hour wheel and gear being so proportioned that for one complete rotation of the hour wheel the gear 107 will be moved through an angular space substantially equal to the length of the slot 128, thereby compressing the spring 129. When such compression of the spring has been effected, the follower roll 116 drops into the low part 114 of the cam, being positively directed thereinto by the guard 115, and the link 119 is moved downward to withdraw the detent 120, releasing the let-off member 122. The spring 129 now expands, and in so doing turns the let-off member and the drum one space, bringing the next stop 105 into operative position and also presenting a new tooth of the let-off member to be engaged by the detent.

The release of the let-off member and drum just described is caused to be effected at midnight of each day, and when such release occurs the carriage will be retracted to an initial or starting position, as will be explained, if the carriage has been previously moved outward away from such position, and the continued advance of the hour wheel acts through the cam 113 to reposition the detent to coöperate with the let-off member before the working hours of the new day.

The series of carriage stops 105 are so located that the particular one which is operatively positioned by periodically changing means just described, will lie in the path of the projection 89 of the traveler 87, so that when the traveler is moved to the left, viewing Figs. 3 and 11, by the first operation of the actuating handle on any given day, the projection 89 will pick up the operativley positioned stop, and will move the carriage bodily to the left from its initial or staring position Fig. 11, the operatively positioned stop wiping over the abutment 94 and depressing it until the traveler has carried the stop 105 beyond the end of such abutment. The spring of the latter thereupon operatively positions the abutment behind the stop on the drum, and as the traveler returns to its normal position, the abutment holds the carriage and the time stamp in proper position with relation to the card receiver or guide.

The total operative stroke of the traveler is long enough to bring any one of the carriage stops 105 into coöperation with the abutment, as has been described, and such coöperation will continue until at midnight of the given day the periodically-changing means operate, turning the drum 104 one step, and thereby releasing the stop 105, then in coöperation with the abutment, so that the carriage can be retracted to initial position, and at the same time the next succeeding stop of the series is brought into operative position.

Each pin 105 of the series corresponds to one of the days of the week, and the lateral position of the carriage with relation to the card receiver is governed by the particular stop which is in operative position at the time the traveler is operated. It will be manifest, however, that while the periodically-changing means described governs the position of the carriage, such means will be brought into operation only by or through the first manual movement of the actuating device or handle following a periodic change.

If the carriage in its initial or starting position is not moved therefrom for one or more days, the step-by-step daily change or advance of the drum continues so long as the time movement remains in operation, so that the apparatus is in proper condition for operation, notwithstanding the intervention of Sundays and holidays on which the apparatus, under ordinary circumstances, would not be brought into operation.

In order to retract the carriage to initial or starting position, a band or other flexible connection 132 is attached at one end to the carriage, and is brought round a guide-sheave 133 mounted on the frame side 37, and then carried up and around a sheave 134 fast on a sleeve 135, see Fig. 9, rotatably mounted on an elongated stud 136, rigidly held in a bracket 137 on the side frame parallel to the path of movement of the carriage.

The sleeve 135 has secured to it one end of a spring 138, coiled around the stud, and secured thereto at its other end by a block 139, Fig. 9, while the hollow drum or cylinder 140 is rigidly attached to the sleeve as by a set screw 141. A curved shield 142 is mounted on the bracket 137, and partly surrounds the drum, the shield having a sight opening 144, see Fig. 3, through which may be seen the names of the days of the week which are displayed upon the outer surface of the cylinder 140, and by reference to Fig. 1, it will be seen that the sight opening 4 in the casing comes opposite the shield opening 144.

When the carriage is moved from its initial or starting position as has been described, the flexible connection 132 is moved in the direction of the arrow 145, Fig. 8, to turn the cylinder 140, and wind up or compress the spring 138, the rotation of the cylinder corresponding to the distance laterally through which the carriage is moved.

The day indications on the cylinder are so spaced that when any one of the carriage stops 105 is brought into coöperation with the abutment 94, the corresponding day of the week will be visible through the sight openings, so that a visual indicator is thus provided to indicate to the operator whether the carriage is properly set for the day of the week.

When the abutment and coöperating carriage stop are released or disengaged, the spring 138 expands and turns in a reverse direction the cylinder 140, winding up to a certain extent the connection 132 on the sheave 134, and thereby retracting the carriage to starting position against the stop 42 hereinbefore referred to. This mechanism just described therefore constitutes a retracting device or means for the carriage and includes a visual indicator to indicate the lateral position of the carriage with relation to the card receiver.

It will be remembered that when the actuating handle is moved in its selective path, the detent 61 is arranged to coöperate with one of the series of teeth 60 on the plate or support 54 for the handle, and as the detent would ordinarily engage the uppermost one of such teeth at the close of a day's work, I have devised means to cause the detent to release the handle support automatically when the carriage is returned to starting position at the time of periodic change. To this end, a lever 146, see Fig. 11, is pivoted on the frame side at 147, the rearward, longer arm of the lever lying in the path of some portion of the carriage, while the front shorter lever arm is reduced at 148 to enter loosely a hole in the link 75. The spring 80 normally tends to draw said link to the right, Fig. 3, and to maintain the detent operative, and the rear arm of the lever 146 is thereby swung inward from the side of the main frame.

When the carriage is released, as has been described, and is retracted to starting position, it hits the lever 146, and swings it to move the link 75 to the left. This operates to move the positioning device 73 into the position shown in Fig. 3, and through the short lever 76 and link 78 to retract the detent 61 from the toothed portion of the handle support, releasing the latter and permitting the spring 64 to return said support and handle to normal position, shown in Fig. 3.

When the carriage is moved from initial position by the traveler, the spring 80 again assumes control of the link 75 and the detent.

The slot-and-pin connection 79 between the detent and the link 78 permits the clicking movement of the detent over the teeth when the actuating handle is advanced.

By the automatic release of the actuating handle, which in practice occurs at midnight, the said handle is in proper position for the first employee who comes in on the following morning to operate the apparatus.

I will now describe the means for causing the time stamp to mark or stamp a record on a card in the receiver.

An operating rock-shaft 149, shown as broken out in Fig. 11, is mounted in suitable bearings on the frame-sides 36, 37, said shaft having fast upon it two rocker arms 150, 151, see Figs. 13, 14 and 15, the arm 150 forming one member of a toggle, the other member 152 being pivoted at its lower end, at 153, to what I have termed a bell-crank 154 fulcrumed at 155 on the base plate of the main frame. Said bell-crank has a curved face 156 eccentric with the fulcrum, and at the rear end of the face the bell-crank is cut away to present a shoulder 157. A toggle actuator 158 is fulcrumed coaxially with the bell-crank and has pivotally attached to it one end of a link 159 extended forward and connected at 160, Fig. 11, with the depending end of the actuating handle 57.

When the parts are in normal position, as in Fig. 15, the roll 102 of the carriage rests against the tie-rod 39, and the toggle 150, 152, the bell-crank and the actuator are in the position shown. At its upper end the toggle actuator has pivoted to it at 161 a coupler 162 herein shown as triangular and provided with a follower 163 adapted to coöperate with the stationary detent 164 mounted on a bracket 165 secured to the base plate. A spring 166 tends to turn the coupler into the position shown in Fig. 15, when the parts are in normal condition, bringing the base of the coupler into position behind and to engage the shoulder 157 of the bell-crank, and at such time the follower 163 is under the detent 164. The pin 167 to which the spring is attached at such time serves as a stop to limit turning movement of the coupler, said pin resting against the rear edge of the toggle actuator 158. If now the actuating handle is moved along the slot 7, Fig. 4, to the selected point, and is then given a transverse movement along one of the slots 8, the link 159 will swing the toggle actuator forward, viewing Fig. 15, bringing the coupler up against the bell-crank, and swinging the latter in unison with the toggle actuator 158, the follower 163 traveling under the detent 164, and being prevented by the latter from turning on its own pivot. As the bell-crank is rocked, the toggle 150, 152 operates to rock the shaft 149 in the direction of the arrow, Fig. 15, until the parts are in substantially the position shown in Fig. 13, wherein the follower 163 is just about to leave the upper forward end of the detent.

A heavy spring 168 attached to an arm 169 on the rock-shaft acts against such turning movement of the shaft, which latter is made effective to swing the carriage forward to bring the hour and minute members of the time stamp into printing position, and also to operate a platen to be referred to to mark the impression on a card.

The impression is made just before the actuating handle 57 completes its secondary movement in one of the slots 8, and as such movement is completed, the follower 163 passes beyond the fixed detent 164, and thereupon the coupler turns on its pivot and rides up onto the curved face 156 of the bell-crank, releasing or uncoupling the latter from the toggle actuator. The spring 168 immediately operates to turn back the shaft 149 and cause the toggle and the bell-crank, to resume the position shown in Fig. 15. As soon as the handle is released, it swings forward by its own weight toward the front of the casing, and the toggle actuator is returned to normal position, the follower now traveling over the top of the fixed detent until it drops off the lower end thereof, and the spring 166 then re-positions the coupler in readiness for the next stamping operation.

Parallel bent levers 170 are fulcrumed on the frame sides, and are connected by a cross-rod 171, Fig. 13, and these levers are connected by depending links 172 with rocking arms 173, see Fig. 11, fast on the rock-shaft 149, the connecting rod 171 being adapted to engage the cross-piece 101 on the upper end of the carriage frame. When the rock-shaft 149 is turned as has been described, by or through the secondary movement of the actuating handle, the links 172 are drawn downward, rocking the bent levers 170, and swinging forward the cross-rod 171, to thereby swing the carriage forward on its guide-way or track 40 as a fulcrum, bringing the time stamp into printing position, and of course as soon as the shaft 149 is released and returns to its normal position, the cross-rod 171 swings back and the carriage follows it until the roll 102 reëngages the tie-rod 39. As the cross-rod 171 extends from one to the other side of the frame, it will properly co-operate with the carriage at any point in the transverse movement of the latter.

The front and rear walls of the card receiver are cut away opposite the printing point, and a platen 174 is movable in and out of the opening in the front wall, said platen sliding horizontally in guides 175 on the bridge 38, see Fig. 3, and it is connected by short links 176 with upturned ears 177 on a sleeve 178 adapted to rock on a rod or shaft 179 suitably supported on the bridge.

The sleeve is shown in Fig. 13 as having an attached rearwardly extended arm 180 connected by a compound link 181, 182, with a bell-crank 183 fulcrumed on the base plate, the two members of the link being connected by a pin 184 on one member entering a slot 185 in the other member, a bow spring 186 tending to maintain the link-members longitudinally extended, one end of the spring being fixed on the link-member 182, and its other member bearing against the pin 184. The bell-crank 183 is pivoted to one end of a link 187 extended rearwardly and pivoted to a segment 188 fulcrumed at 189 on the base-plate, and at its front, upper corner connected by a link 190 with the rocker arm 151 of the shaft 149. When the latter is rocked in the direction of the arrow, Fig. 15, the link 190 swings the segment 188, and through the connecting link 187, the bell-crank 183 is rocked to draw down the compound link 181, 182, to thereby turn the sleeve 178 and press the platen inward against the back of the card, forcing the latter against the printing or marking wheels of the time stamp just at the instant that the latter are moved forward and reach full printing position.

When the rock-shaft 149 is released and returns to normal position, the intervening connections just described retract the platen, so that the card can be readily withdrawn from the card-receiver.

The bow-spring 186 acts as a coupling for the platen, in case the platen should be stopped before the rock-shaft 149 has completed its turning movement, for then the bow spring will be compressed, as the bell-crank 183 continues to rock while the platen remains stationary.

Any suitable inking means may be employed to ink the marking wheels of the time stamp and herein I prefer to use an ink-ribbon supported between the card receiver and the marking wheels, and preferably the ends of the ribbon will be wound upon up right spools, one of which is shown as 191, Fig. 8.

The spools may be rotated in any suitable manner, involving no part of this invention, to traverse the ribbon longitudinally, and they may also be made to change their position vertically to effect an up-and-down shift of the ribbon, if desired, substantially as provided in my co-pending application.

So far as my present invention is concerned, however, the inking device may be of any suitable character, and so too, the marking members or wheels of the time stamp and the mechanism to operate the same may be of any suitable form, and not at all restricted to what I have herein shown and briefly described.

While the general operation of the apparatus has been explained from time to time herein, a brief statement of the complete operation will be given, and it will be supposed that the periodic change of the means governing the time stamp carriage has taken place. The carriage therefore will be in its initial or starting position, and when the first workman arrives the following morning to register his time, he places his card in the card receiver, grasps the actuating handle 57, and moves it along its main path, in the slot 7 of the casing, until opposite the transverse slot indicating "Morning in," thereby positioning his card vertically in the card receiver. The proper point in the selective path of movement of the actuating handle has thus been reached, and in making such movement the toothed portion of the handle-support has been brought into engagement with the coöperating detent, and at the same time, the segment 65 has been coupled to and moved with the handle-support to act through the means described and properly position the carriage for that particular day. This is all effected automatically by or through the simple selective movement of the actuating handle, and thereafter the said handle is moved in the proper slot 8 to cause the time stamp to stamp the card in the manner hereinbefore described.

The release of the handle from the means which effect the printing or stamping movement of the carriage and platen is instantly noticeable to the employee, and in practice a bell is frequently employed to be rung at the instant the impression on the card is made.

Having made the impression the handle is released, it swings back into its selective path, but remaining opposite the transverse slot 8 just used, and the card properly stamped is taken out, and the apparatus is ready for the next employee. The first selective movement of the actuating handle also causes the uncoupling of the segment 65, and the handle, and the positioning device 73 is moved up into position against the end 71 of the segment. Thereafter any number of employees may operate the apparatus, but without again coupling the handle and segment for that day.

At 12 o'clock midnight of that particular day, the periodic change takes place, the carriage is released by moving one of its stops from engagement with the abutment 94, the latter being stationary or fixed relatively to the movement of the carriage, and the latter is returned to starting position, the detent 61 being automatically released thereby, and at the same time, the positioning device 73 is moved into the position shown in Fig. 3, so that the coupling member is positioned to couple the handle and segment 65 together at the first operation the next morning.

In order that certain underlying features of this invention may be rendered somewhat clearer and more readily understood, it may here be noted that by the peculiar mounting and connections of the actuating lever 57 and associated parts this mechanism is compactly and efficiently disposed and adapted for a maximum of ease and simplicity of actuation. By reason of these features of construction one definite and distinct motion determines the position of the record card with respect to the printing wheels and another definite and different motion causes the formation of the records, this arrangement permitting an accurate positioning of the record and its formation at precisely the desired instant. These features of construction have already been clearly set forth and are reiterated at this point merely to emphasize and render clearer the corresponding portions of applicant's invention.

My invention is not restricted to the precise construction and arrangement of parts herein shown and described, as the same may be changed or modified by those skilled in the art without departing from the spirit and scope of my invention.

Having fully described my invention, what I claim as new and desire to secure by Letters Patent is:—

1. In a time recorder, the combination with a time stamp, of a fixed card receiver or guide, an actuating device for causing the stamp to mark a card in the receiver, a movable stop to coöperate with and vary the position of a card in the receiver to thereby vary the position of the card relatively to the stamp, said stop being positioned by operation of the actuating device, and periodically changing means to govern the relative position of the stamp and card receiver.

2. In a time recorder, the combination with a time stamp, of a card receiver or guide, a movable stop to coöperate with a card inserted therein and position such card relatively to the time stamp, a manually operated actuator to move the stop at will to any desired operating position and also to cause the stamp to mark a card in the receiver, and periodically changing means to govern the relative position of the stamp and card receiver.

3. In a time recorder, the combination with a time stamp, of a fixed card receiver or guide, a movable stop to coöperate with and position a card, inserted in said receiver, relatively to the time stamp, and an actuator having a selective movement to determine the position of the stop and having another movement to cause the stamp to mark a card in the receiver.

4. In a time recorder, the combination with a time stamp, of a fixed card receiver or guide, a movable stop to coöperate with and position a card, inserted in said receiver, relatively to the time stamp, and a manually operated actuator having a selective movement in one path to determine the position of the stop and having another movement at different points in such path to cause the stamp to mark a card in the receiver.

5. In a time recorder, the combination with a time stamp, of a fixed card receiver or guide, a movable stop to coöperate with and position a card, inserted in said receiver, relatively to the time stamp, an actuator having a selective movement in an angular path to determine the position of the stop and having a movement at right angles to such angular path at predetermined points thereon to cause the stamp to mark a card in the receiver, and periodically changing means to govern the relative position of the stamp and card receiver.

6. The combination with a time stamp, and a card receiver or guide, of a movable stop to coöperate with and vary the position of a card in the receiver relatively to the stamp, means to position the stop at the will of the operator and to cause the stamp to mark the card when positioned, periodically changing means to govern the relative position of the stamp and card receiver, and connections between said means and the stop-positioning means to render the former operative, after a periodic change, by or through the first subsequent operation of the latter means.

7. The combination with a time stamp, and a card receiver or guide, of a movable stop to coöperate with and vary the position of a card in the receiver relatively to the stamp, an actuating device to position the stop and also to cause the stamp to mark a card in the receiver, periodically changing means to govern the relative position of the time stamp and card receiver, and means intermediate said actuating device and said governing means to render the latter operative by the first operation only of the actuating device after a periodic change.

8. In a time recorder, the combination with a time stamp, of a card receiver or guide, a movable stop to position a card inserted therein relatively to the stamp, an actuator having a selective movement in one path, and a different movement at predetermined points in such path, the former movement determining the position of the stop and the latter movement causing the stamp to mark a card in the receiver, and a detent to retain the actuator at any one of such predetermined points until positively moved therefrom.

9. In a time recorder, the combination with a time stamp, of a card receiver or guide, a movable stop to position a card inserted therein relatively to the stamp, an actuator manually movable to any one of a plurality of points in a single path, to position the stop, a detent to retain the actuator at a selected point until positively moved therefrom, the actuator having a different movement from a selected point to cause the stamp to mark a card in the receiver, and means to automatically render the detent inoperative at predetermined intervals of time.

10. The combination with a manually-actuated time stamp, of a fixed card receiver or guide, a movable stop to vary the position of a card in said receiver relatively to the time stamp, means to effect the movement of the stop at will to any desired position and to actuate the stamp when the stop is positioned, and means to govern the relative position of the stamp and receiver, said means being changed automatically at predetermined intervals and rendered operative by initial movement only of the stop-positioning means after a change.

11. The combination with a time stamp, and a fixed card receiver or guide, of a movable stop to coöperate with the receiver and vary the position of a card therein relatively to the time stamp, means to change the position of the stop at will, and automatic periodically changing means to govern the relative position of the stamp and receiver, brought into operation by the stop-positioning means.

12. The combination with a time stamp, and a fixed card receiver or guide, of a movable stop to coöperate with the receiver and vary the position of a card therein relatively to the time stamp, means to change the position of the stop at will, a detent to retain said means and the stop in a given position until positively moved therefrom, periodically changing means, brought into operation by the stop-positioning means, to govern the relative position of the stamp and card receiver, and a device to render inoperative the detent upon each of such periodic changes.

13. In a time recorder, the combination with a time stamp and operating means therefor, of a card guide or receiver relatively to which the time stamp is adjustable in one direction, a card-engaging stop manually movable to any desired point relatively to the stamp in another direction, and periodically changing means to govern the adjustment of the time stamp with relation to the card receiver.

14. In a time recorder, the combination with a time stamp and operating means therefor, of a card guide or receiver relatively to which the time stamp is adjustable in one direction, a stop movable at the will of the operator to position a card at any desired point in the receiver relatively to the time stamp, means to govern the adjustment of the latter relatively to the card receiver and time mechanism to effect periodic changes in said means.

15. In a time recorder, the combination with a time stamp and operating means therefor, of a card guide or receiver relatively to which the time stamp is adjustable in one direction, a stop movable at the will of the operator to position a card at any desired point in the receiver relatively to the time stamp, periodically-changing means to govern the adjustment of the stamp relatively to the receiver, a time mechanism to effect such changes, and stop-positioning means to render operative the said governing means.

16. In a time recorder, the combination with a card receiver or guide and a stop to limit movement of a card therein relatively to the time stamp, of a time stamp, a time movement controlling it, an actuating device to position the stop and also to cause the stamp to mark a card in the receiver, means including a member periodically changed by said time movement, to govern the relative position of the stamp and card receiver, and connections between said means and the actuating device to bring the former into operation upon the first actuation of the latter after a periodic change.

17. In a time recorder, the combination with a card receiver or guide, and a stop to limit movement of a card therein relatively to the time stamp, of a time stamp, movable laterally of the card receiver, a manually-operated actuator having different movements to position the stop and cause the stamp to mark a card in the receiver, a time movement controlling the stamp, means movable laterally with the latter, and including a member intermittingly changed by the time movement, to govern the position of the stamp with relation to the card receiver, and mechanism operated by the first movement only of the actuator after a change in said member of the governing means to bring the latter into operation.

18. In a time recorder, in combination, a fixed card receiver or guide, a movable stop to engage a card therein and position it relatively to the time stamp, an actuator for said stop, a time stamp, a carriage on which it is mounted, movable laterally of the card receiver, an abutment, a series of stops bodily movable with the carriage and adapted to coöperate singly with said abutment, to thereby position the time stamp with relation to the card receiver, automatic means to bring one after another of said stops into operative position at predetermined intervals, and mechanism to move the carriage laterally to effect coöperation between said abutment and the operatively-positioned stop of the series upon the first movement of the actuator after automatic positioning of such stop.

19. In a time recorder, in combination, a fixed card receiver or guide, a movable stop to engage a card therein and position it relatively to the time stamp, an actuator for said stop, a time stamp, a carriage on which it is mounted, movable laterally of the card receiver, an abutment, a spirally-arranged series of stops bodily movable with the carriage, to coöperate singly with the abutment and position the time stamp relatively to the card receiver, automatic means to bring one after another of the stops into operative position at predetermined intervals of time, a retracting device for the carriage, and mechanism to move the carriage laterally to effect coöperation between said abutment and the operatively-positioned stop of the series upon the first movement of the actuator after automatic positioning of such stop, each automatic change in the position of the stops disengaging the then coöperating stop and the abutment and permitting the retracting device to return the carriage to inactive position.

20. The combination with a time stamp, of an upright, fixed card receiver or guide, manually controlled means to at will vary the effective depth thereof, said means including a vertically movable stop to form a bottom for the receiver, and periodically changing means to govern the lateral position of the time stamp with relation to said receiver, said means being brought into operation manually.

21. The combination with a laterally movable time stamp, of a fixed card receiver or guide adjacent thereto and having an upright opening therein, a stop movable in such opening to support and determine the position of a card in the receiver relatively to the time stamp, an actuator operatively connected with and to move the stop at will, means, including a periodically changing device, to govern the lateral position of the time stamp, and mechanism operated by initial movement of said actuator after a periodic change to bring said governing means into operation, whereby the lateral position of the time stamp is determined until the next periodic change.

22. The combination, with a time stamp, and a laterally movable carriage on which it is mounted, of an adjacent upright card receiver having a stamping opening, a vertically movable stop to sustain a card in the receiver, whereby different portions of the card will be presented at the stamping opening, a manually operated actuator to effect movement of the stop and also to cause the stamp to mark the card, a rotatable drum or carrier mounted on the carriage and provided with a series of radial, helically arranged stops, a stationary spring-abutment to engage any one of such stops and thereby hold the carriage and time stamp in a definite position with relation to the card receiver, a time movement to automatically and intermittingly effect rotation of the drum or carrier to bring one after another of said stops, beginning with the innermost, into position to coöperate with the abutment, a device to retract the carriage whenever a stop is moved out of the path of the abutment, and mechanism automatically operative upon the initial movement of the actuator after retraction of the carriage, to move said carriage and effect coöperation between the abutment and the stop of the series then in operative position.

23. In a time recorder, in combination, a time movement, a time impressing or stamping instrumentality driven thereby, a movable carriage on which said instrumentality is mounted, a retracting device for the carriage, a series of carriage stops controlled by the time movement and movable one by one into operative position at predetermined intervals of time, a relatively stationary abutment to coöperate with an operatively positioned stop and thereby retain the carriage in a given position until such time interval terminates, a manually operated actuator and mechanism acting upon the first movement of said actuator in one of the time intervals to move the carriage against its retracting device and effect coöperation between the abutment and the operatively positioned carriage stop.

24. In a time recorder, in combination, a card receiver, manually operated means to vertically position a card therein, a time stamp, a time movement by which the stamp is driven, a carriage on which the stamp is mounted, movable horizontally adjacent said receiver, a stationary abutment, a series of stops on the carriage, to coöperate individually with the abutment and thereby fix the position of the time stamp relatively to a card in the receiver, mechanism controlled by the time movement to bring the stops singly into operative position, a retracting device for the carriage, and a manually actuated traveler to engage the operatively positioned stop and move the carriage from starting position and bring such stop into coöperation with the abutment.

25. In a time recorder, in combination, a time stamp, means to at will change the vertical position of a card relatively thereto, whereby successive records for a given day will lie in a vertical column on the card, a horizontally movable carriage on which the stamp is mounted, means operated upon the first vertical positioning of a card at the beginning of each day to properly position the stamp and card laterally, said means including an automatic daily change mechanism to govern the positioning of the carriage and time stamp, and a visual indicator to show the daily change.

26. The combination with an upright card receiver, a manually-actuated, vertically movable stop to coöperate with a card therein and determine its vertical position relative to the time stamp, and such time stamp, of a laterally movable carriage adjacent the receiver, a relatively fixed abutment, a horizontal rotatable drum on the carriage provided with a series of helically disposed stops, to successively coöperate with the abutment and thereby position the carriage at gradually increasing distances from its starting point, means to rotate the drum step by step at predetermined intervals of time, to bring one stop after another into operative position and to disengage the next preceding stop from the abutment, releasing the carriage, a spring-actuated retracting device to return the released carriage to starting position, and manually actuated means to move the carriage from such position after an advance of the drum and thereby to effect coöperation between the abutment and the operatively positioned stop.

27. The combination, with a card receiver, of a time stamp, a carriage therefor movable laterally of the card receiver and adjacent thereto, a relatively fixed abutment, a series of stops on the carriage to successively coöperate with the abutment when the carriage is at gradually increased distances from its starting point, means to move said series of stops automatically at midnight of each day, to release one stop from the abutment and bring the next stop into operative position, a device to return the carriage to its starting point when so released, and mechanism, including a manually operated actuator and a sliding traveler having a fixed stroke, to move the carriage from its starting position after a change of stop and bring the newly positioned stop into coöperation with the abutment.

28. The combination, with a card receiver, of a time stamp, a carriage therefor movable laterally of the card receiver and adjacent thereto, a relatively fixed abutment, a series of stops on the carriage to successively coöperate with the abutment when the carriage is at gradually increased distances from its starting point, means to move said series of stops automatically at midnight of each day, to release one stop from the abutment and bring the next stop into operative position, a device to return the carriage to its starting point when so released, mechanism, including a manually operated actuator and a sliding traveler having a fixed stroke, to move the carriage from its starting point after a change of stops and bring the newly positioned stop into coöperation with the abutment, and an automatic trip to disconnect said traveler and actuator after the first operation of the latter to set the carriage.

29. The combination, with a card receiver, of a time stamp, a carriage therefor movable laterally of the card receiver and adjacent thereto, a relatively fixed abutment, a series of stops on the carriage to successively coöperate with the abutment when the carriage is at gradually increased distances from its starting point, means to move said series of stops automatically at midnight of each day, to release one stop from the abutment and bring the next stop into operative position, a device to return the carriage to its starting point when so released, mechanism, including a manually operated actuator and a sliding traveler having a fixed stroke, to move the carriage from its starting point after a change of stops and bring the newly positioned stop into coöperation with the abutment, a trip to automatically disconnect the traveler and actuator after the first operation of the latter to set the carriage, and means to operatively connect the traveler and actuator upon the return of the carriage to its starting point.

30. In a time recorder, an upright, fixed card receiver, a manually controlled stop coöperating therewith to vary its effective depth, an angularly movable actuator to operate the stop and also to cause the time stamp to mark a card in the receiver, a time stamp, including hour and minute marking members, a time movement to drive the minute member continuously and to effect advance of the hour member at the end of each hour, a carriage movable laterally of the card receiver and on which the time stamp is mounted, a relatively fixed, yielding abutment, a horizontal, rotatable drum on the carriage provided with a series of helically arranged stops to coöperate one after another with the abutment, to hold the carriage in a given position, a device to return automatically the carriage to starting position when released, a spring to turn the drum, wound up by or through rotation of the hour marking member, a let-off member rotatable with said drum, a detent normally coöperating with said member and releasing the same at intervals of twenty-four hours, to permit the spring to turn the drum one step, releasing the carriage and bringing another stop into operative position, and means to move the carriage from starting position and effect cooperation of the then operatively positioned stop and the abutment by or through the first angular movement of the actuator after a rotative movement of the drum.

31. In a time recorder, an upright, fixed card receiver, a manually controlled stop cooperating therewith to vary its effective depth, an angularly movable actuator to operate the stop and also to cause the time stamp to mark a card in the receiver, a time stamp, including hour and minute marking members, a time movement to drive the minute member continuously and to effect advance of the hour member at the end of each hour, a carriage movable laterally of the card receiver and on which the time stamp is mounted, a relatively fixed, yielding abutment, a horizontal rotatable drum on the carriage provided with a series of helically arranged stops to coöperate one after another with the abutment, to hold the carriage in a given position, a device to return automatically the carriage to starting position when released, a spring to turn the drum, wound up by or through rotation of the hour marking member, a let-off member rotatable with said drum, a detent normally coöperating with the let-off member, means governed by the time movement to withdraw the detent at predetermined intervals and permit the spring to advance the drum one step, thereby releasing the carriage and operatively positioning the next stop, manually controlled means to adjust the let-off member with relation to the drum, and means to move the carriage from its starting position and effect cooperation of the abutment and the then operatively positioned stop by or through the first movement of the actuator after an advance of the drum.

32. In a time recorder, a time stamp including hour and minute marking members, and a platen, a fixed card receiver, a movable stop to coöperate therewith and determine the vertical position of a card inserted in the receiver, and a manually operated actuator to move said stop, combined with stamp-operating means controlled by said actuator, to move the marking members and platen toward each other, to make a record on a card in the receiver, a device to automatically release the stamp-operating means from control of said actuator after the latter has been moved, and after the stamp has been operated, and means operative upon the first movement of the actuator in a given day to effect proper relative positioning of the time stamp and card receiver for such day.

33. In a time recorder, a time stamp including hour and minute marking members, and a platen, a fixed card receiver, a movable stop to coöperate therewith and determine the vertical position of a card inserted in the receiver, and an actuating handle movable in one direction to position the stop, combined with means controlled by movement of the handle in a different direction to move the marking members and platen toward each other, to make a record on a card in the receiver, and a device to automatically release said means from control of the actuating handle after the latter has been moved, first to position the stop and thereafter to effect the actuation of the time stamp.

34. In a time recorder, in combination, a time stamp, a laterally movable, swinging carriage on which it is mounted, an operating shaft, connections between it and the carriage to positively swing the latter and cause the time stamp to make a record, a spring to return the parts to normal position, an actuating handle, a coupling between it and the shaft, means to automatically uncouple the shaft and handle when operative movement of the latter has been effected and after the record has been made, periodically changing means to govern the position of the carriage in its lateral path of movement, mechanism to coöperate with said means and position the carriage upon the initial movement of the actuating handle after a periodic change, and a device to disconnect automatically said mechanism and handle after the carriage has been laterally positioned, subsequent movements of the handle to swing the carriage causing no change in its lateral position.

35. In a time recorder, in combination, a time stamp, a rock-shaft operatively connected therewith, a bell-crank, a toggle connecting it and the rock-shaft to turn the latter, an actuating handle, a toggle-actuator positively connected therewith, a coupler pivoted on said actuator to engage the bell-crank and cause it to move in unison with the toggle-actuator, a stationary detent to coöperate with the coupler and maintain it operative until the rock shaft has been turned, continued movement of the toggle actuator causing release of the coupler by its detent, and disconnecting the bell-crank and actuator, whereby the rock-shaft is freed, and a spring to pivotally move the coupler and return it to operative position under control of the detent when the toggle-actuator is returned to starting position.

36. In a time recorder, in combination, a card receiver, a time stamp movable relatively thereto, actuating means to cause it to mark a card in the receiver, a relatively fixed abutment, a series of stops to successively coöperate therewith and determine the lateral position of the time stamp, said stops being movable bodily therewith, mechanism to effect automatically a periodic change of the stops with relation to the abutment, means to effect automatic return of the time stamp to starting position upon each periodic change, and mechanism, operated by or through the first operation only of the stamp actuating means when the stamp is in starting position, to move the latter therefrom and effect coöperation between the abutment and the stop which at such time is operatively positioned.

37. In a time recorder, a fixed card receiver, a time stamp and its carriage, movable transversely thereto, a manually controlled actuator, means operated thereby to cause the stamp to mark a card in the receiver, a helical series of stops rotatably mounted on the carriage, a device to coöperate with a stop and retain the carriage at a determined point in its path of movement, means to periodically rotate the stops, releasing the carriage and operatively positioning another stop, spring-actuated means to retract the released carriage to starting position, mechanism operated by the actuator to move the carriage from starting position and effect coöperation between the operatively positioned stop and the retaining device, and a device to automatically disconnect the said mechanism and actuator after the carriage has been so moved.

38. In a time recorder, a fixed card receiver, a time stamp and its carriage, movable transversely thereto, a manually controlled actuator, means operated thereby to cause the stamp to mark a card in the receiver, a helical series of stops rotatably mounted on the carriage, a device to coöperate with a stop and retain the carriage at a determined point in its path of movement, means to periodically rotate the stops, releasing the carriage and operatively positioning another stop, a rotatable visual indicator, a spring to turn it in one direction, a flexible connection between the indicator and the carriage, the spring turning the indicator and through said connection retracting the released carriage to starting position and mechanism operated by the actuator to move the carriage from starting position and effect coöperation between the operatively positioned stop and the retaining device, such movement of the carriage acting against the spring and setting the indicator to correspond with the position of the carriage.

39. The combination, with a time stamp including hour and minute marking wheels, of a time movement to drive the minute wheel continuously and to cause hourly advance of the hour wheel, a shiftable carriage on which said wheels are mounted, a retracting spring for and operatively connected with the carriage, a horizontal, rotatable drum on the latter, provided with a helically-arranged series of stops, a relatively fixed abutment to coöperate with a stop and retain the carriage in a corresponding position, a segmentally slotted gear loose on the drum-shaft, a let-off member rotatable with the drum, a spring attached at one end to the gear, a pin on the let-off member entering the slot in the gear and coöperating with the other end of the spring, means to advance the gear and compress the spring during each rotation of the hour marking wheel, a detent normally coöperating with the let-off member to hold the drum from rotation, means including a cam, to cause the detent to release the let-off member each time the hour wheel completes one revolution, whereby the spring advances the drum one step, to operatively position a stop, and manually controlled means to move the carriage and bring the last previously positioned stop into coöperation with the abutment, the next advance of the drum releasing the carriage, permitting retracting thereof to starting position by its retracting spring.

40. In a time recorder, in combination, a card receiver or guide, a manually movable stop, to engage a card therein, and position it relatively to the time stamp, a time stamp, including hour and minute marking wheels, a carriage for said stamp, an abutment, a series of stops bodily movable with the carriage, and adapted to coöperate singly with the abutment, to position the time stamp relatively to the card receiver, a time movement operatively connected with and to drive the minute wheel continuously, connections between the time movement and the hour wheel, including a worm let-off, to cause intermittent rotation of the hour wheel, and a spring motor wound by operation of the time movement and rotating the hour wheel when the latter is released by the let-off, the winding of the motor being effected when the let-off is acting to prevent advance of the hour wheel, means controlled by the hour wheel to bring one after another of said stops automatically into operative position at predetermined intervals, and mechanism to effect movement of the carriage and cause coöperation of the abutment and the operatively positioned stop of the series after automatic positioning of the stop.

41. In a time recorder, in combination, a fixed card receiver, a movable stop to coöperate with and position a card inserted in the receiver, an actuating handle operatively connected with and to move the stop, said handle having a selective movement in a fixed main path, a detent to retain the handle at a selected point in such main path until positively moved therefrom, said handle having a secondary movement at right angles to its selective path of movement, a time stamp, means to cause it to stamp a card in the receiver when the handle is given such secondary movement, and a casing having an elongated slot to accommodate selective movement of the handle, and a series of communicating slots at right angles, to direct the secondary movement of the handle and indicate the selective points at which the handle is to be stopped in its main path of movement.

42. In a time recorder, an actuating handle, a support on which it is pivoted, a fulcrum for and on which the support and handle can be swung in unison, the fulcrum and pivot being at right angles to each other, a segment adapted to rock on the fulcrum adjacent said support, a coupling member pivoted on the latter and adapted to ride freely over the edge of the segment or to couple the same and the handle support, a positioning device for the coupling member, movable toward and from the segment and having a face corresponding in curvature to the curved edge of the segment, a follower on said coupling member, a fixed cam-like controller for the follower, to retain the coupling member in coupling position until movement of the handle and segment disengage the follower and controller, uncoupling the segment, the coupling member riding over the edge of the segment and the face of the positioning device on return of the handle and being thereby maintained inoperative, mechanism actuated by movement of the segment when coupled to the handle-support, and means acting at predetermined intervals to move the positioning device away from the segment and permit the follower to pass below said controller, while the coupling member moves into operative position prior to the next swing of the handle in unison with its support.

43. In a time recorder, the combination with marking members or wheels, of means for retaining the same in recording position, and automatic means operating at predetermined intervals to release said members and remove them in an axial direction from such recording position.

44. In a time recorder, in combination, printing or marking wheels, a carriage therefor, and means, including an automatic device mounted on the carriage, to retain the latter in position to print and to effect release thereof at the end of predetermined intervals.

45. In a time recorder in combination, printing or marking wheels, a carriage therefor, and means, including a device mounted on the carriage and controlled by a time movement, to retain the carriage in position to print and to effect release thereof at predetermined intervals.

46. In a time recorder, the combination, with printing wheels, and a carriage therefor, of means, including an intermittingly rotated member on the carriage to retain it in printing position, and means to remove the carriage from printing position when permitted to operate by rotative movement of said member.

47. In a time recorder, the combination, with time marking mechanism, of an operating member movable in one direction to set said mechanism in proper daily relation to a card to be marked, and movable in another direction to cause said mechanism to mark the card, and means to automatically render said mechanism irresponsive to subsequent setting movements of the operating member for a predetermined period after said mechanism has been set.

48. In a time recorder, the combination, with printing mechanism, of an operating member movable in one direction to effect adjustment of a record card and the printing mechanism in two directions relative to each other prior to actuation of the printing mechism to mark the card.

49. In a time recorder, the combination, with printing mechanism, of an operating member movable in one direction to effect adjustment of a record card and the printing mechanism in two directions relative to each other, and means whereby movement of said operating member in a secondary direction causes the printing mechanism to make an impression.

50. In a time recorder, means, including a handle, to effect manually the adjustment of a card to proper position to correspond to different periods of the day, means to retain said handle in certain positions, and an instrumentality to release automatically said handle at the end of a fixed period.

51. In a time recorder, in combination, a bodily movable time stamp, means to retain it in recording position, and independent, automatic means to release and remove the time stamp bodily from such position.

52. In a time recorder, a time stamp, a carriage therefor, automatically controlled and manually operated means to effect operative positioning of the carriage for printing, and a device to thereafter release the carriage from control by said means, and thereby render subsequent operations of said means inoperative to effect a change in the position of the carriage until the end of a predetermined interval of time.

53. In a time recorder, a bodily movable time stamp, manually operated means to move the same into position to mark a card, and a device to release the time stamp from the control of said means before a record can be made by the time stamp.

54. In a time recorder, in combination, a card receiver extending without the casing of the recorder and adapted to permit the insertion of individual record cards and their withdrawal in all positions thereof, clock controlled time printing wheels, a member pivotally mounted to swing in two directions, means connected with said member and adapted to cause the same upon swinging in one direction to adjust the relative positions of said card receiver and said printing wheels, and means connected with said member and adapted upon the same swinging in the other direction to form a record upon a card in said receiver.

55. In a time recorder, in combination, a card receiver adapted to permit the insertion and withdrawal of individual record cards, clock controlled time printing wheels, a member pivotally mounted to swing in two directions, means connected with said member and adapted to cause the same upon swinging in one direction to adjust the relative positions of said card receiver and said printing wheels, means connected with said member and adapted upon the same swinging in the other direction to form a record upon a card in said receiver, and a clock controlled member adapted to determine the relative positions of said printing wheels and the record card upon said pivotally mounted member being placed in position to form a record.

56. In a time recorder, in combination, a card receiver extending without the casing of the recorder and adapted to permit the insertion of individual record cards, and their withdrawal in all positions thereof, clock controlled time printing wheels, a member pivotally mounted to swing in two directions, means connected with said member and adapted to cause the same upon swinging in one direction to adjust the relative positions of said card receiver and said printing wheels, means connected with said member and adapted upon the same swinging in the other direction to form a record upon a card in said receiver, and means adapted to prevent said second movement of said member until the same has been swung in said first direction to a predetermined point or points.

57. In a time recorder, in combination, a card receiver adapted to permit the insertion and withdrawal of individual record cards, clock controlled time printing wheels, a member pivotally mounted to swing in two directions, means connected with said member and adapted to cause the same upon swinging in one direction to adjust the relative positions of said card receiver and said printing wheels, means connected with said member and adapted upon the same swinging in the other direction to form a record upon a card in said receiver, and a rotatably mounted member intermittently driven from clock work and adapted to determine the relative positions of said printing wheels and said card upon said member being placed in position to form a record.

58. In a time recorder, in combination, a card receiver adapted to permit the insertion and withdrawal of individual record cards, clock controlled time printing wheels, said printing wheels and said receiver being mounted to move in a straight line with respect one to another, a member pivotally mounted to swing in two directions, means connected with said member and adapted to cause the same upon swinging in one direction to adjust the relative positions of said card receiver and said printing wheels, a platen, means connected with said platen and said pivotally mounted member adapted upon said member swinging in the other direction to cause said platen to force a record card against said printing wheels and form a record thereon, and a clock controlled member adapted to determine the relative positions of said printing wheels and said card upon said pivotally mounted member being placed in position to form a record.

59. In a time recorder, in combination, a card receiver adapted to permit the insertion and withdrawal of individual record cards, clock controlled time printing wheels, a member mounted to move in two directions, means connected with said member adapted to cause the same upon moving in one direction to adjust the relative positions of said card receiver and said printing wheels, means connected with said member and adapted upon the same moving in the other direction to form a record upon a card in said receiver, and a clock controlled member adapted to determine the relative positions of said printing wheels and the record card upon said member being placed in position to form a record.

60. In a time recorder, in combination, a card receiver adapted to permit the instrtion and withdrawal of individual record cards, clock controlled time printing wheels, a member pivotally mounted to swing in one direction, means connected with said member and adapted to cause the same upon swinging in said direction to adjust the relative positions of said card receiver and said printing wheels, an actuating lever pivotally mounted at a point intermediate its ends upon said member and adapted to swing in another direction, and means connected with said actuating lever and adapted upon the same swinging in said last direction to form a record upon a card in said receiver.

61. In a time recorder, in combination, a card receiver adapted to permit the insertion and withdrawal of individual record cards, clock controlled time printing wheels, a member pivotally mounted to swing in one direction, means connected with said member and adapted to cause the same upon swinging in said direction to adjust the relative positions of said card receiver and said printing wheels, an actuating lever pivotally mounted at a point intermediate its ends upon said member and adapted to swing in another direction, and means connected with said actuating lever and adapted upon the same swinging in said last direction to form a record upon a card in said receiver, said last means comprising a platen adapted to engage the rear surface of a card in said receiver and throw the same against said printing wheels.

62. In a time recorder, in combination, a card receiver adapted to permit the insertion and withdrawal of individual record cards, clock controlled time printing wheels, a member pivotally mounted to swing about an axis, means connected with said member and adapted to cause the same upon swinging to adjust the relative positions of said card receiver and said printing wheels, an actuating lever pivotally mounted upon said member and adapted to swing in another direction and having a portion substantially opposite the axis about which said first member swings, and means connected with said actuating lever adapted upon its end remote from said axis being forced inwardly to utilize the outward movement of its portion substantially opposite said axis and thereby form a record upon a card in said receiver.

63. In a time recorder, in combination, a card receiver adapted to permit the insertion and withdrawal of individual record cards, clock controlled time printing wheels, a member pivotally mounted to swing about an axis, means connected with said member adapted to cause the same upon swinging to adjust the relative positions of said card receiver and said printing wheels, an actuating lever pivotally mounted upon said member and having one end substantially opposite the axis thereof, means connected with said end of said lever and adapted upon the outer end of said lever being thrown inwardly to be drawn outwardly thereby, a rocking member connected with said last means, and a platen connected with said rocking member, whereby said platen is actuated and a record formed upon the outer end of said actuating lever being swung toward the instrument.

64. In a time recorder, in combination, a card receiver adapted to permit the insertion and withdrawal of individual record cards, clock controlled time printing wheels, a member pivotally mounted to swing about an axis, means connected with said member adapted to cause the same upon swinging to adjust the relative positions of said card receiver and said printing wheels, an actuating lever pivotally mounted upon said member and having one end substantially opposite the axis thereof, means connected with said end of said lever and adapted upon the outer end of said lever being thrown inwardly to be drawn outwardly thereby, a rocking member connected with said last means, a platen connected with said rocking member whereby said platen is actuated and a record formed upon the outer end of said actuating lever being swung toward the instrument, and means adapted to prevent said record forming movement of said actuating lever until the same has been swung with said pivotally mounted member to a predetermined point or points.

65. In a time recorder, in combination, a card receiver adapted to permit the insertion and withdrawal of individual record cards, clock controlled time printing wheels, a member pivotally mounted to swing about an axis, means connected with said member adapted to cause the same upon swinging to adjust the relative positions of said card receiver and said printing wheels, an actuating lever pivotally mounted upon said member and having one end substantially opposite the axis thereof, means connected with said end of said lever and adapted upon the outer end of said lever being thrown inwardly to be drawn outwardly thereby, a rocking member connected with said last means, a platen connected with said rocking member whereby said platen is actuated and a record formed upon the outer end of said actuating lever being swung toward the instrument, and a clock controlled member adapted to determine the relative positions of said printing wheels and said card receiver upon said actuating lever being placed in position to form a record.

66. In a time recorder, in combination, a card receiver adapted to permit the insertion and withdrawal of individual record cards, clock controlled time printing wheels, a member pivotally mounted to swing about an axis, means connected with said member and adapted to cause the same upon swinging to adjust the relative positions of said card receiver and said printing wheels, an actuating lever pivotally mounted upon said member and adapted to swing in another direction and having a portion substantially opposite the axis about which said first member swings, means connected with said actuating lever adapted upon its end remote from said axis being forced inwardly to utilize the outward movement of its portion substantially opposite said axis and thereby form a record upon a card within said receiver, and a clock controlled member adapted to determine the relative positions of said printing wheels and said card receiver upon said actuating lever being placed in position to form a record.

In testimony whereof, I have signed my name to this specification, in the presence of two subscribing witnesses.

CHAS. T. HAWLEY.

Witnesses:
AGNES E. COBURN,
LAURA L. BROOKS.